(12) United States Patent
Isaji et al.

(10) Patent No.: US 8,078,383 B2
(45) Date of Patent: Dec. 13, 2011

(54) SPEED CONTROL SYSTEM FOR VEHICLES

(75) Inventors: Kazuyoshi Isaji, Kariya (JP); Naohiko Tsuru, Handa (JP)

(73) Assignee: Denso Corporation, Kariya (JP)

( * ) Notice: Subject to any disclaimer, the term of this patent is extended or adjusted under 35 U.S.C. 154(b) by 748 days.

(21) Appl. No.: 12/284,867

(22) Filed: Sep. 25, 2008

(65) Prior Publication Data
US 2009/0093938 A1 Apr. 9, 2009

(30) Foreign Application Priority Data

Oct. 9, 2007 (JP) .................................. 2007-263683
Apr. 3, 2008 (JP) .................................. 2008-097536
May 14, 2008 (JP) .................................. 2008-127664

(51) Int. Cl.
*G06F 19/00* (2006.01)
(52) U.S. Cl. .............. 701/96; 701/36; 701/93; 701/301; 340/903; 340/425.5; 342/70
(58) Field of Classification Search .................... 701/96, 701/36, 93, 301; 340/903, 425.5; 342/70
See application file for complete search history.

(56) References Cited

U.S. PATENT DOCUMENTS

| | | | |
|---|---|---|---|
| 6,339,740 B1 * | 1/2002 | Seto et al. ........................ 701/96 |
| 6,496,770 B2 * | 12/2002 | Winner et al. ................... 701/96 |
| 6,684,149 B2 * | 1/2004 | Nakamura et al. .............. 701/96 |
| 6,769,504 B2 * | 8/2004 | Kobayashi et al. ........... 180/169 |
| 6,785,611 B2 * | 8/2004 | Ibrahim ........................ 701/301 |
| 6,941,216 B2 * | 9/2005 | Isogai et al. ..................... 701/96 |
| 7,103,478 B2 * | 9/2006 | Sawamoto ..................... 701/301 |
| 7,280,903 B2 * | 10/2007 | Arai et al. ........................ 701/96 |
| 7,433,772 B2 * | 10/2008 | Isaji et al. ........................ 701/71 |
| 7,594,496 B2 * | 9/2009 | Frenz et al. ............. 123/406.23 |
| 7,610,121 B2 * | 10/2009 | Nishira et al. ..................... 701/1 |
| 7,733,772 B2 * | 6/2010 | Hazra et al. ................... 370/230 |
| 7,769,498 B2 * | 8/2010 | Isaji et al. ......................... 701/1 |
| 7,840,354 B2 * | 11/2010 | Knoop et al. ................. 701/301 |
| 7,925,413 B2 * | 4/2011 | Isaji et al. ....................... 701/93 |
| 8,010,274 B2 * | 8/2011 | Sawada .......................... 701/96 |
| 2007/0021876 A1 * | 1/2007 | Isaji et al. ......................... 701/1 |

(Continued)

FOREIGN PATENT DOCUMENTS

JP 06-40270 2/1994

(Continued)

OTHER PUBLICATIONS

U.S. Appl. No. 12/151,998, filed May 12, 2008, Isaji et al.

*Primary Examiner* — Thomas Black
*Assistant Examiner* — Wae Louie
(74) *Attorney, Agent, or Firm* — Harness, Dickey & Pierce, PLC

(57) ABSTRACT

In a vehicle speed control system, a preset offset distance is taken as a zero value of an inter-vehicle distance in a brake discriminant. When the current value of a corrected distance condition evaluation index is higher than the brake discriminant, a value on the brake discriminant is set as a target value of the corrected distance condition evaluation index. Deceleration control is started to decelerate the subject vehicle so that the deceleration of the subject vehicle becomes equal to the target deceleration of the subject vehicle computed based on the target relative speed corresponding to the set target value and the actual relative speed.

18 Claims, 9 Drawing Sheets

U.S. PATENT DOCUMENTS

| | | | |
|---|---|---|---|
| 2007/0276574 A1* | 11/2007 | Isaji et al. | 701/70 |
| 2008/0059037 A1* | 3/2008 | Isaji et al. | 701/93 |
| 2009/0093938 A1* | 4/2009 | Isaji et al. | 701/96 |

FOREIGN PATENT DOCUMENTS

| | | |
|---|---|---|
| JP | 2006-69419 | 3/2006 |
| JP | 2007-76632 | 3/2007 |
| JP | 2007-076632 | 3/2007 |
| JP | 2007-112231 | 5/2007 |
| JP | 2007-128567 | 5/2007 |
| JP | 2007-326548 | 12/2007 |
| JP | 2008-074378 | 4/2008 |

* cited by examiner

SPEED CONTROL SYSTEM FOR VEHICLES

CROSS REFERENCE TO RELATED APPLICATION

This application is based on and incorporates herein by reference the whole contents of Japanese Patent Applications No. 2007-263683 filed on Oct. 9, 2007, No. 2008-97536 filed on Apr. 3, 2008, and No. 2008-127664 filed on May 14, 2008.

FIELD OF THE INVENTION

The present invention relates to a speed control system for vehicles.

BACKGROUND OF THE INVENTION

In conventional inter-vehicle distance control systems, the enhancement of response to inter-vehicle distance control between a subject vehicle and a preceding vehicle traveling ahead the subject vehicle and the securement of safety are achieved by taking the following measure.

For example, in the inter-vehicle distance control device described in Patent Document 1 (JP 2567548), when the vehicle speed of the subject vehicle is high and when the inter-vehicle distance is short, the time constant of a filter for relative speed is reduced. When the vehicle speed of the subject vehicle is low and when the inter-vehicle distance is long, the time constant of a filter for relative speed is increased. However, this inter-vehicle distance control system controls the vehicle speed of the subject vehicle based on the relative speed between the subject vehicle and the preceding vehicle so that the inter-vehicle distance is kept constant. The feeling of deceleration at this time is not always comfortable for the driver.

To cope with this, the drive assistance system described in Patent Document 2 (US 2007/0021876, JP 2007-76632A) takes the following measure. This drive assistance system takes, as a driver condition coefficient to be taken as a target (target driver condition coefficient), the driver condition coefficient in a state in which a driver in condition suitable for driving is performing driving operation so as to keep constant the inter-vehicle distance between the preceding vehicle and the subject vehicle. The drive assistance system computes a relative acceleration/deceleration between the subject vehicle and the preceding vehicle to be taken as the target (target relative acceleration/deceleration) based on the target driver condition coefficient and the present driver condition coefficient. The subject vehicle is accelerated or decelerated based on this target relative acceleration/deceleration.

The drive assistance system described in Patent Document 2 does not take the speed of the preceding vehicle into account to determine acceleration/deceleration start timing. Therefore, the driver may not be able to feel the comfortableness of acceleration depending on the driving scene. For this reason, it is proposed in U.S. patent application Ser. No. 12/151,998 filed on May 12, 2008 to determine acceleration/deceleration start timing by using an approximate expression (brake discriminant KdBc) of a corrected distance condition evaluation index KdBc with the speed of the preceding vehicle taken into account so that comfortability can be thereby ensured. The distance condition evaluation index is an evaluation index regarding approaching to and separating from the preceding vehicle.

In this brake discriminant KdBc, the inter-vehicle distance when the preceding vehicle and the subject vehicle come closest to each other is ensured by taking the following measure, as illustrated in FIG. 14. When the inter-vehicle distance D between the preceding vehicle and the subject vehicle is in a short distance range (actual 0 to Dq [m]), the discriminant is substantially unchanged and the deceleration output is increased by reducing an apparent target. For this reason, the target of deceleration output has an inflection point at some midpoint in the process of the inter-vehicle distance D being shortened. As a result, the deceleration output is varied and discomfort is brought to the driver at the time of deceleration.

A brake system for vehicles is also proposed in U.S. patent application Ser. No. 11/805,236, which uses an expression obtained by modifying the following Expression 1 to control deceleration.

$$|-Vr| = 2.5 \times D^3 \times 10^{(|KdB|/10-8)} \quad \text{(Expression 1)}$$

This expression is a formula for computation of distance condition evaluation index, that is evaluation index of approaching/separating relative to the preceding vehicle. In this expression, Vr is target relative speed and KdB is distance condition (approaching/separating) evaluation index.

In this brake system, deceleration is controlled in the following manner. The initial value of distance condition evaluation index when brake operation is started is determined. The subsequent target value of distance condition evaluation index is increased with a constant gradient based on the slope (change rate) of distance condition evaluation index at the start of the brake operation. The deceleration is controlled based on the target relative speed corresponding to this target value and the actual relative speed.

However, the deceleration control using the technique described in the above patent application may not be matched with the feeling of the driver for the following reason.

Assuming that the distance D at the start of control is D0 and the distance condition evaluation index at the start of control be KdB0, the gradient of a tangent of Expression 1 at the start of deceleration control is expressed by Expression 2:

$$dKdB/dD = -30 \times \log_{10} e/D0 = -13.03/D0 \quad \text{(Expression 2)}$$

According to Expression 2, an intercept of the tangent is expressed by Expression 3:

$$y\text{-intercept} = KdB0 + 13.03/D0 \times D0 = KdB0 + 13.03 \quad \text{(Expression 3)}$$

According to the gradient and y-intercept expressed by Expressions 2 and 3 and the initial values D0 and KdB0 at the start of control, the expression of the tangent, that is, the formula for computation of KdB t is expressed by Expression 4:

$$KdBt = -13.03 \times D/D0 + KdB0 + 13.03 \quad \text{(Expression 4)}$$

When Expression 5 obtained by modifying Expression 4 is substituted into Expression 1, the formula for computation of target relative speed indicated as Expression 6 is obtained:

$$KdBt/10 = -1.303 \times D/D0 + 0.1 \times KdB0 + 1.303 \quad \text{(Expression 5)}$$

$$Vrt = -2.5 \times D^3 \times 10^{\{-1.303 \times D/D0 + 0.1 \times KdB0 - 6.697\}} \quad \text{(Expression 6)}$$

A target relative speed is determined using Expression 6, and deceleration is controlled based on this target relative speed and the actual relative speed. As a result, the vehicle is smoothly decelerated. However, expression 6 means that deceleration is controlled so that Vr=0 when D=0. That is, in deceleration control using Expression 6, deceleration is controlled so that the relative speed becomes 0 when a collision occurs. For this reason, this deceleration control is not matched with the feeling of the driver, and as a result, discomfort is brought to the driver.

SUMMARY OF THE INVENTION

It is therefore an object of the invention is to provide a speed control system for vehicles that makes it possible not to bring discomfort to a driver during deceleration.

According to one aspect, a speed control system is configured to:
detect a distance to a preceding vehicle;
detect a relative speed between a subject vehicle and the preceding vehicle;
compute a corrected distance condition evaluation index which is increased with increase in the relative speed when approaching the preceding vehicle and whose increase gradient becomes greater as the distance to the preceding vehicle becomes shorter at each relative speed as an index indicating the condition of approaching or separating from the preceding vehicle by taking into consideration of a speed of the preceding vehicle;
set a threshold value of the corrected distance condition evaluation index and takes an offset amount preset with respect to distance as zero value of distance at the threshold value of the corrected distance condition evaluation index;
check whether the corrected distance condition evaluation index is higher than the threshold value of the corrected distance condition evaluation index;
when the corrected distance condition evaluation index is higher than the threshold value of the corrected distance condition evaluation index, set the threshold value of the corrected distance condition evaluation index as a target value of the corrected distance condition evaluation index;
compute the target deceleration of the subject vehicle based on a target relative speed corresponding to the target value set by the target value setting means and an actual relative speed; and
start deceleration control to decelerate the subject vehicle so that deceleration of the subject vehicle becomes equal to the target deceleration.

According to a second aspect, a speed control system is configured to:
detect a distance to an object ahead;
detect a relative speed between a subject vehicle and the object ahead;
store a correction formula for computation of a corrected target relative speed obtained by correcting a formula for computation of a target relative speed with an offset amount indicating the target relative speed when the distance is zero,
wherein the formula for computation of target relative speed is determined from a distance condition evaluation index relational expression and a tangential expression so that a target relative speed is determined based on the distance,
wherein, the distance condition evaluation index relational expression indicates a relation among the distance condition evaluation index indicating condition of distance to the object ahead, a distance to the object ahead and the relative speed, so that the distance condition evaluation index is increased with increase in the relative speed when approaching the object ahead and an increase gradient of the distance condition evaluation index becomes greater as the distance to the object ahead becomes shorter at identical relative speed, and
wherein the tangential expression indicates a tangent of a curve represented by the distance condition evaluation index relational expression, and is determined by differentiating the distance condition evaluation index relational expression by the distance, thereby indicating a relation between the distance condition evaluation index and the distance;
compute a target relative speed from the correction formula for computation of target relative speed and a distance actually detected by the distance detecting means;
compute a target deceleration from a target relative speed computed by the target relative speed computing means and a relative speed actually detected by the relative speed detecting means; and
perform deceleration control on the subject vehicle based on the target deceleration.

According to a third aspect, a speed control system is configured to:
detect a distance to an object ahead;
detect a relative speed between a subject vehicle and the object ahead;
store a correction formula for computation of a corrected target relative speed obtained by correcting a formula for computation of a target relative speed with an offset amount indicating the distance when the relative speed is zero,
wherein the formula for computation of target relative speed is determined from a distance condition evaluation index relational expression and a tangential expression so that a target relative speed is determined based on the distance,
wherein, the distance condition evaluation index relational expression indicates a relation among the distance condition evaluation index indicating condition of distance to the object ahead, a distance to the object ahead and the relative speed, so that the distance condition evaluation index is increased with increase in the relative speed when approaching the object ahead and an increase gradient of the distance condition evaluation index becomes greater as the distance to the object ahead becomes shorter at identical relative speed, and
wherein the tangential expression indicates a tangent of a curve represented by the distance condition evaluation index relational expression, and is determined by differentiating the distance condition evaluation index relational expression by the distance, thereby indicating a relation between the distance condition evaluation index and the distance;
compute a target relative speed from the correction formula for computation of target relative speed and a distance actually detected by the distance detecting means;
compute a target deceleration from a target relative speed computed by the target relative speed computing means and a relative speed actually detected by the relative speed detecting means; and
perform deceleration control on the subject vehicle based on the target deceleration.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
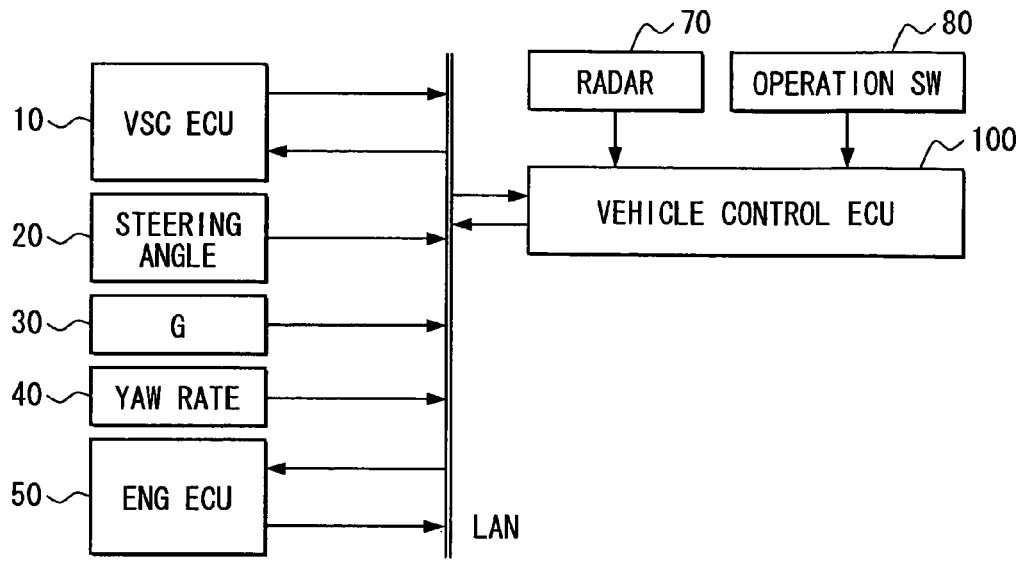
FIG. 1 is a block diagram illustrating a drive assistance system in a first embodiment.

Referring to FIG. 1, a speed control system for vehicles is applied to a drive assistance system as an example. The drive assistance system is mounted on a subject vehicle (not shown) and constructed of a vehicle stability control (VSC) electronic control unit (ECU) 10, a steering angle sensor 20, a G sensor 30, a yaw rate sensor 40, engine (ENG) ECU 50, a radar 70, an operation switch group (SW) 80, and a vehicle control ECU 100.

The VSC ECU 10 controls a brake actuator (not shown) that applies braking force to the subject vehicle and has a vehicle stability control function for suppressing skidding of the subject vehicle. The VSC ECU 10 receives information on a target deceleration through an in-vehicle LAN and controls the brake actuator so that this target deceleration is produced in the subject vehicle. The VSC ECU 10 transmits information on the speed (subject vehicle speed) Vs0 and braking pressure of the subject vehicle to the in-vehicle LAN.

The steering angle sensor 20 detects information on the steering angle of the steering gear of the subject vehicle and transmits the detected information on steering angle to the in-vehicle LAN.

The G sensor 30 is an acceleration sensor that detects acceleration produced in the direction of the length of the subject vehicle (longitudinal G) and acceleration produced in the lateral (right and left) direction (lateral G). The G sensor 30 transmits information on the detected longitudinal G and lateral G to the in-vehicle LAN.

The yaw rate sensor 40 detects the angular velocity (yaw rate) around the vertical axis of the subject vehicle and transmits information on the detected yaw rate to the in-vehicle LAN.

The ENG ECU 50 receives information on target acceleration from the in-vehicle LAN and controls a throttle actuator (not shown), so that the subject vehicle produces the target acceleration.

The radar 70 irradiates a predetermined range in front of the subject vehicle with, for example, laser light and receives the resulting reflected light to detect the following: the inter-vehicle distance D from the subject vehicle to the preceding vehicle, the relative speed Vr between the subject vehicle and the preceding vehicle; the displacement between the central axis of the subject vehicle in the direction of width and the central axis of the preceding vehicle (lateral displacement), and the like. The radar 70 outputs the detected information to the vehicle control ECU 100.

The operation SW 80 is a group of switches operable by the driver of the subject vehicle and information on the operation of the switch group is outputted to the vehicle control ECU 100. The vehicle control ECU 100 is constructed based on a microcomputer and is constructed of CPU, ROM, RAM, I/O, and a bus connecting them which are all known.

Figure 2:
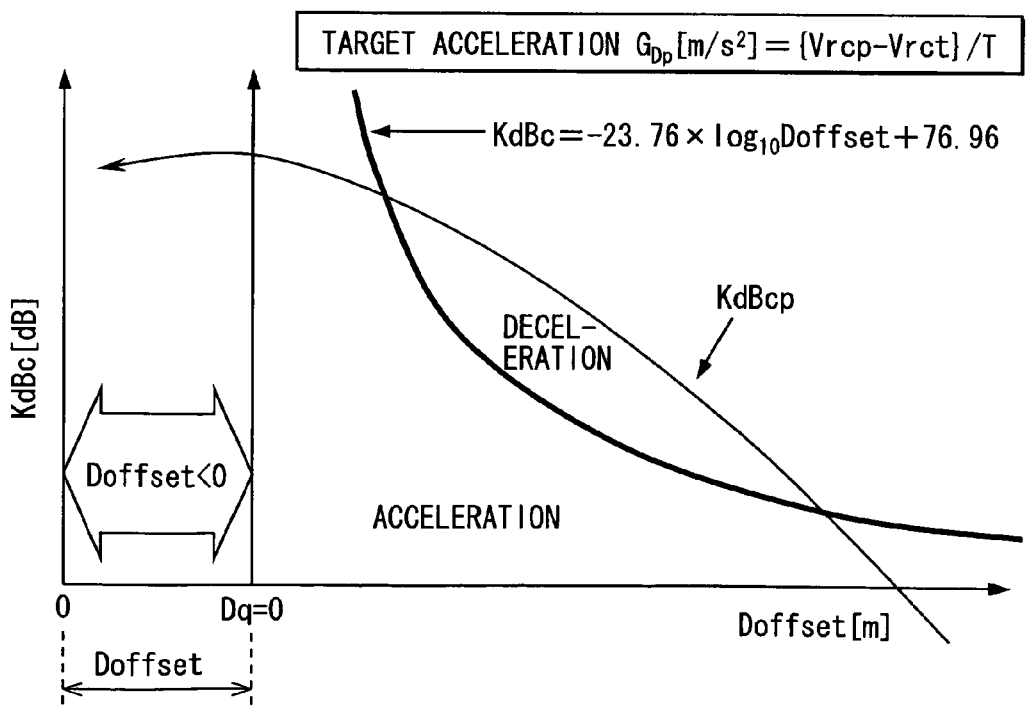
FIG. 2 is an explanatory diagram illustrating varying brake discriminant KdBc and current value (KdBct) of corrected distance condition evaluation index KdBc depending on inter-vehicle distance Doffset.
Figure 14:
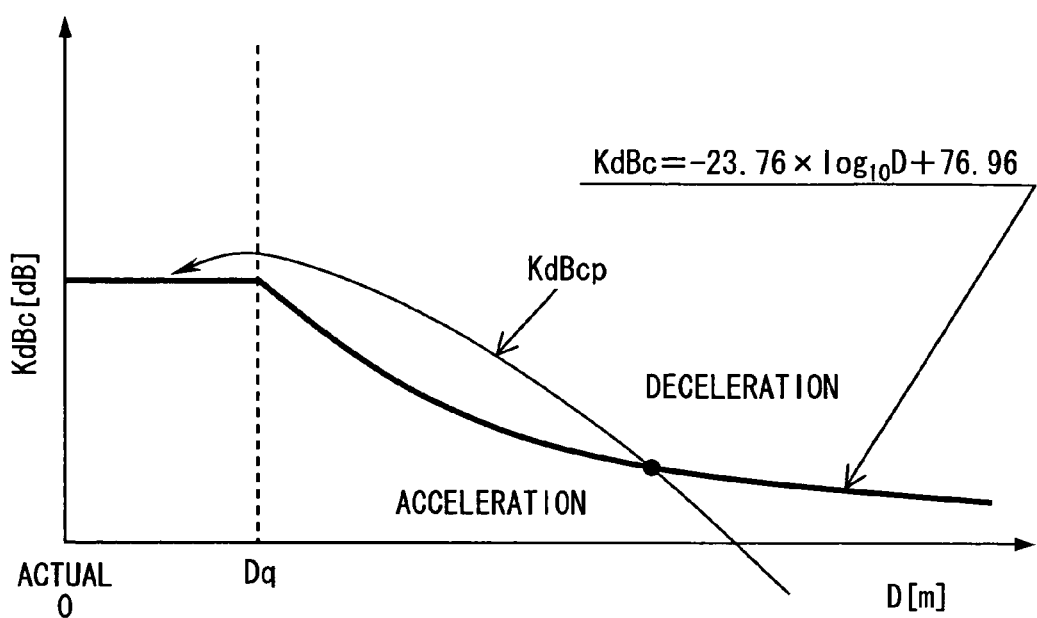
FIG. 14 is an explanatory diagram illustrating brake discriminant KdBc in a related art.

The vehicle control ECU 100 uses the brake discriminant KdBc illustrated in FIG. 2 to determine deceleration control start timing when the subject vehicle travels following the preceding vehicle. The vehicle control ECU 100 carries out deceleration control to produce the following in the subject vehicle: a target relative speed Vrct corresponding to the brake discriminant KdBc and a target acceleration/deceleration $G_{Dp}$ computed from the relative speed Vrcp of the subject vehicle. The vehicle control ECU 100 thereby obtains the feeling of deceleration comfortable for the driver in various driving scenes. The brake discriminant KdBc illustrated in FIG. 14 is described in U.S. patent application Ser. No. 12/151,998. Therefore, the description of the brake discriminant KdBc will be omitted, and description will be given with a focus on a difference.

Unlike the brake discriminant KdBc illustrated in FIG. 14, the brake discriminant KdBc used in the first embodiment is so constructed that the zero value (=0 [m]) of the inter-vehicle distance D is taken as the closest inter-vehicle distance Dq. More specifically, as illustrated in FIG. 2, an offset distance Doffset is provided so that deceleration control is completed at the closest inter-vehicle distance Dq. The brake discriminant KdBc in FIG. 2 is given by Expression 8:

$$KdBc = -23.76 \times \log_{10} Doffset + 76.96 \quad \text{(Expression 8)}$$

The brake discriminant KdBc of Expression 8 is set with an inter-vehicle distance equal to or longer than the closest inter-vehicle distance Dq. In the drive assistance system, therefore, it is possible to carry out deceleration control so that deceleration is completed at an inter-vehicle distance equal to or longer than the closest inter-vehicle distance Dq. As a result, the target deceleration of the subject vehicle does not have an inflection point at some midpoint in the process of the inter-vehicle distance being shortened and discomfort will not be brought to the driver during deceleration.

Figure 3:
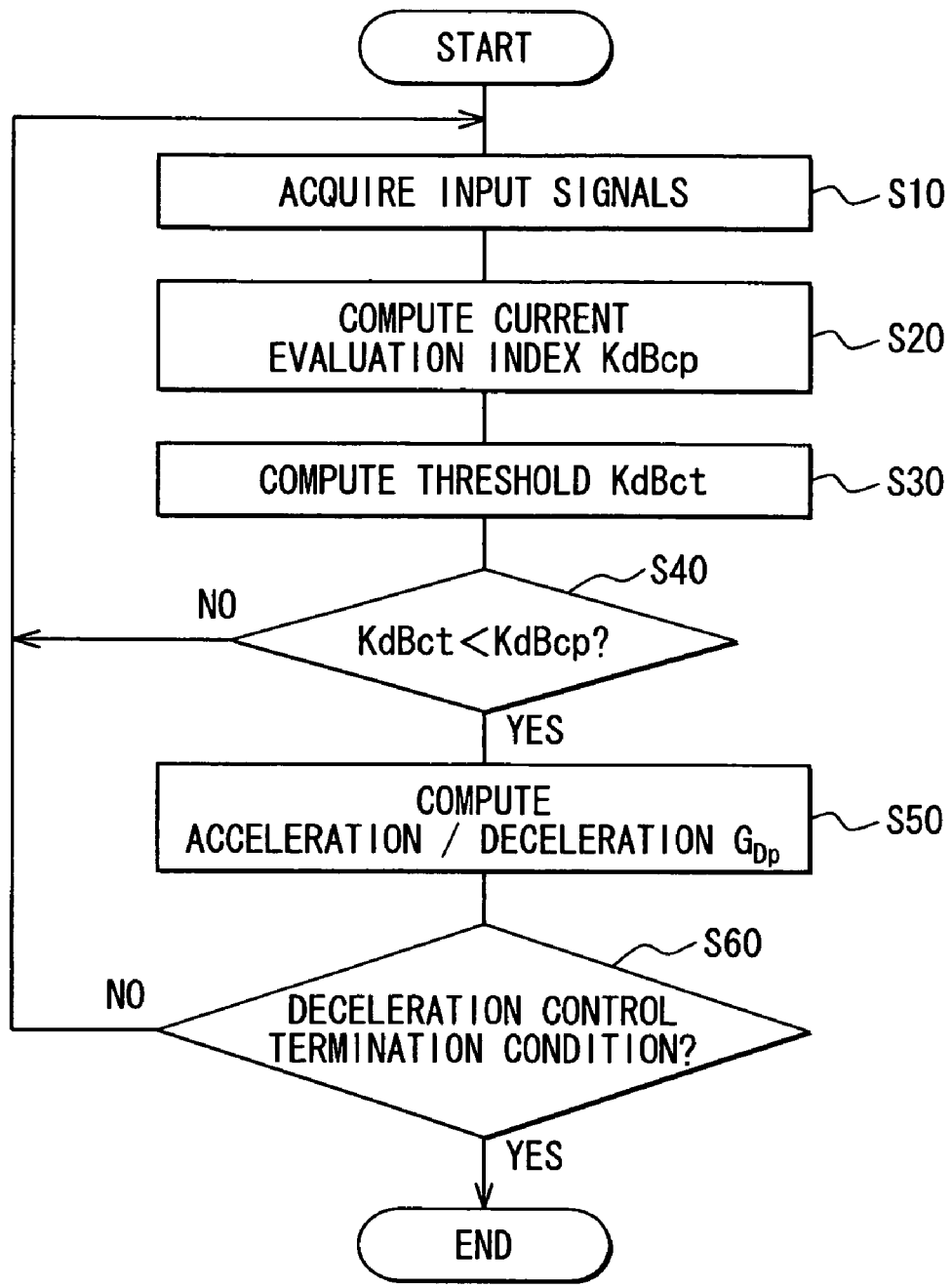
FIG. 3 is a flowchart illustrating acceleration/deceleration control processing performed in the first embodiment.

The deceleration control processing is performed by the vehicle control ECU 100 by executing the processing shown in FIG. 3. First, at S10 in FIG. 3, input signals are acquired from various sensors. At S20, the current value KdBcp of corrected distance condition evaluation index KdBc is computed. At S30, a threshold value KdBct on the brake discriminant KdBc corresponding to the inter-vehicle distance Doffset obtained by adding the offset distance to the actual inter-vehicle distance to the preceding vehicle is computed from Expression 8.

At S40, it is checked whether the current value KdBcp of corrected distance condition evaluation index KdB is higher than the threshold value KdBct on the brake discriminant KdBc. When an affirmative determination (Yes) is made here, the processing proceeds to S50. When a negative determination (No) is made, the processing returns to S10 and the above processing is repeated.

At S50, as illustrated in FIG. 2, a target acceleration/deceleration $G_{Dp}$ to be produced in the subject vehicle is computed. This target acceleration/deceleration $G_{Dp}$ is given by Expression 9:

$$G_{Dp} = (Vrcp - Vrct)/T \quad \text{(Expression 9)}$$

Vrcp in Expression 9 represents the actual relative speed of the subject vehicle. Vrct is a target relative speed obtained by taking the following procedure: a threshold value KdBct on the brake discriminant KdBc corresponding to the inter-vehicle distance Doffset, obtained by adding the offset distance to the actual inter-vehicle distance to the preceding vehicle, is determined from the brake discriminant KdBc. This threshold value KdBct is substituted into Expression 10 below. This Expression 10 is described in U.S. patent application Ser. No. 12/151,998, and thus the description of the expression will be omitted here. Here, α is a coefficient not more than 1, and it has been found that α=0.3 or so is most appropriate. T is a divisor for transforming the difference between the present relative speed Vrcp of the subject vehicle and the target relative speed Vrct to the acceleration/deceleration $G_{Dp}$ of the subject vehicle taken as a target.

$$KdBc = 10 \times \log\left(\left|-2 \times \frac{|Vr| + \alpha \times |Vb|}{D^3 \times 5 \times 10^{-8}}\right|\right) \quad \text{(Expression 10)}$$

At S60, it is checked whether a termination condition for deceleration control has been met. For example, the following events can be used for this deceleration control termination condition: the subject vehicle is stopped; and the current value KdBcp of corrected distance condition evaluation index KdBc falls below the threshold value KdBct on the brake discriminant KdBc. When the control termination condition has not been met, the processing of S10 and the following steps is repeated.

In the above drive assistance system, the brake discriminant KdBc is set with the inter-vehicle distance equal to or longer than the preset offset distance Doffset. Therefore, deceleration control can be performed so that deceleration is completed at the inter-vehicle distance equal to this offset distance Doffset. As a result, the target deceleration of the subject vehicle does not have an inflection point at some midpoint in the process of the inter-vehicle distance being shortened, and the driver will not feel discomfort driver during deceleration.

Second Embodiment

In the second embodiment as well, a drive assistance system may be configured in the same way as the first embodiment.

However, the formula for computation of corrected target relative speed, expressed by Expression 11, is stored in a storage device, such as the ROM, internal to the vehicle control ECU 100 or a storage device provided separately from the vehicle control ECU 100:

$$Vrtafter = Vr0 - \frac{Vr0 - Vroffset}{Vr0} \times \quad \text{(Expression 11)}$$
$$\left\{Vr0 + 2.5 \times D^3 \times 10^{\left(\frac{-1.303}{D0} \times D + 0.1 \times KdB0 - 6.697\right)}\right\}$$

When a deceleration control start condition is met, the vehicle control ECU 100 carries out deceleration control using Expression 11 above.

Expression 11 is obtained by taking the following measure. With respect to the formula for computation of target relative speed expressed by Expression 6, the target relative speed at distance D=0 is offset to the positive side by the offset relative speed Vroffset. From D=D0 to 0, the formula for computation is varied at a relative speed obtained by multiplying the rate A of change in relative speed indicated in Expression 12 by the target relative speed Vrt that can be computed by Expression 6. The formula for computation is obtained by transposing the Vr0 term in Expression 13 to the right side after the modification of expression represented by Expression 13.

$$a = \text{rate} = \frac{Vr0 - Vroffset}{Vr0} \quad \text{(Expression 12)}$$

$$Vr0 - Vrtafter = a \times (Vr0 - Vrt) = \frac{Vr0 - Vroffset}{Vr0} \times \quad \text{(Expression 13)}$$
$$\left\{Vr0 + 2.5 \times D^3 \times 10^{\left(\frac{-1.303}{D0} \times D + 0.1 \times KdB0 - 6.697\right)}\right\}$$

Figure 5:
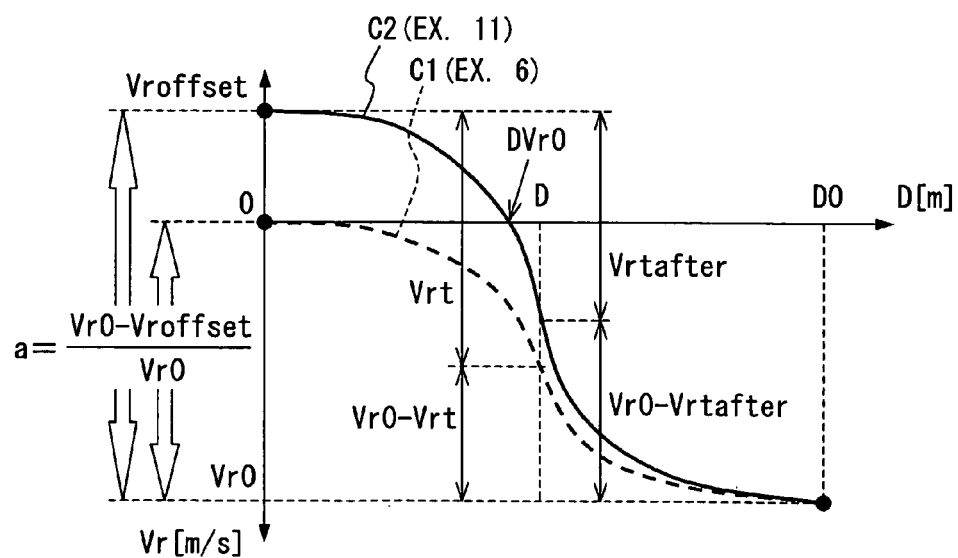
FIG. 5 is an explanatory diagram illustrating comparison between curve C1 represented by a formula for computation of target relative speed and curve C2 represented by a formula for computation of corrected target relative speed.

FIG. 5 is a diagram illustrating comparison between a curve C1 represented by Expression 6 (formula for computation of target relative speed) and a curve C2 represented by Expression 11 (formula for computation of corrected target relative speed). In the curve C2 represented by the formula for computation of corrected target relative speed, as indicated by FIG. 5 as well, the distance Dvr0 at which the relative speed is 0 is greater than zero.

Figure 6:
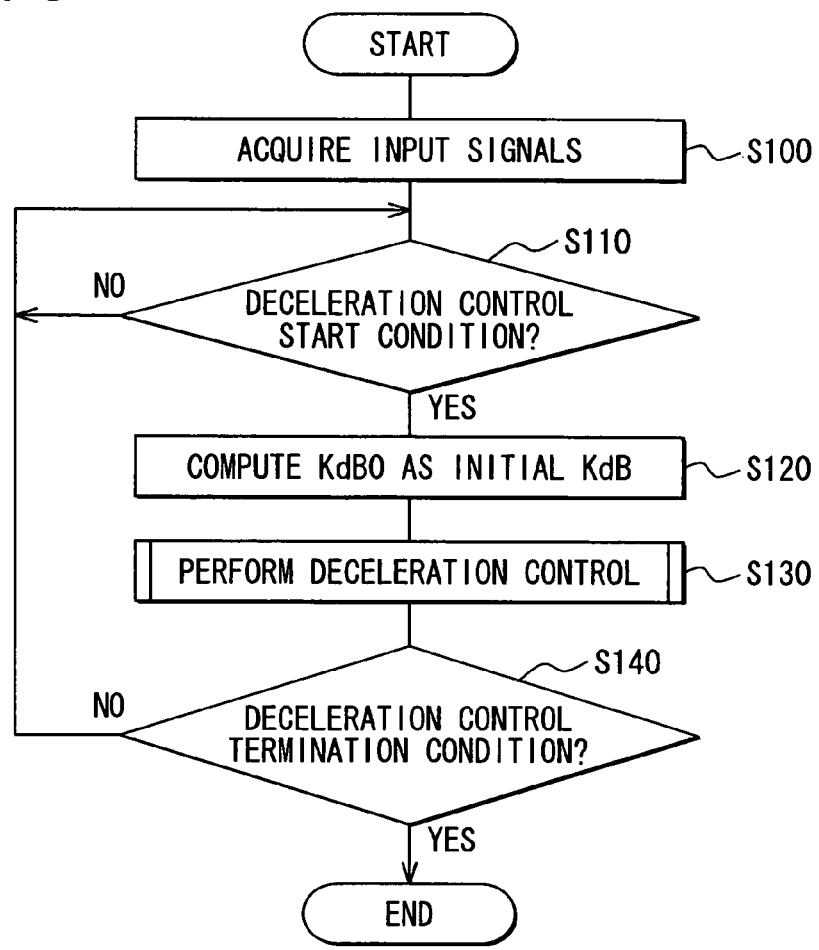
FIG. 6 is a flowchart illustrating control performed in a second embodiment.

The vehicle control ECU 100 in the second embodiment executes the processing illustrated in FIG. 6 in a predetermined cycle.

At S100, first, input signals are acquired from various sensors. At S110, subsequently, it is checked whether a deceleration control start condition has been met. In the second embodiment as well as the first embodiment, the following is taken as this deceleration control start condition. The current value KdBcp of corrected distance condition evaluation index KdB is higher than the threshold value KdBct on the brake discriminant KdBc. When an affirmative determination is made here, the processing proceeds to S120. When a negative determination is made, the processing returns to S100 and the above processing is repeated.

At S120, the initial value KdB0 of distance condition evaluation index KdB is computed. Specifically, the commutation is performed by substituting the following into Expression 14: the distance D0 to the preceding vehicle detected by the radar 70 and acquired at the immediately preceding step, or S100 and the relative speed Vr0 which is a rate of time change in this distance D0. Expression 14 is obtained by modifying Expression 1:

$$KdB = 10 \times \log\left(\left|-2 \times \frac{Vr}{D^3} \times \frac{1}{5 \times 10^{-8}}\right|\right) \quad \text{(Expression 14)}$$

At S130, subsequently, deceleration control using Expression 11 is performed. The processing of S130 will be described in detail later. At S140, subsequently, it is checked whether a deceleration control termination condition has been met. For example, the following events can be used for this deceleration control termination condition: the subject vehicle is stopped; and the current value KdBcp of corrected distance condition evaluation index KdBc falls below the threshold value KdBct on the brake discriminant KdBc. When the deceleration control termination condition has not been met, the processing of S100 and the following steps are repeated.

Figure 7:
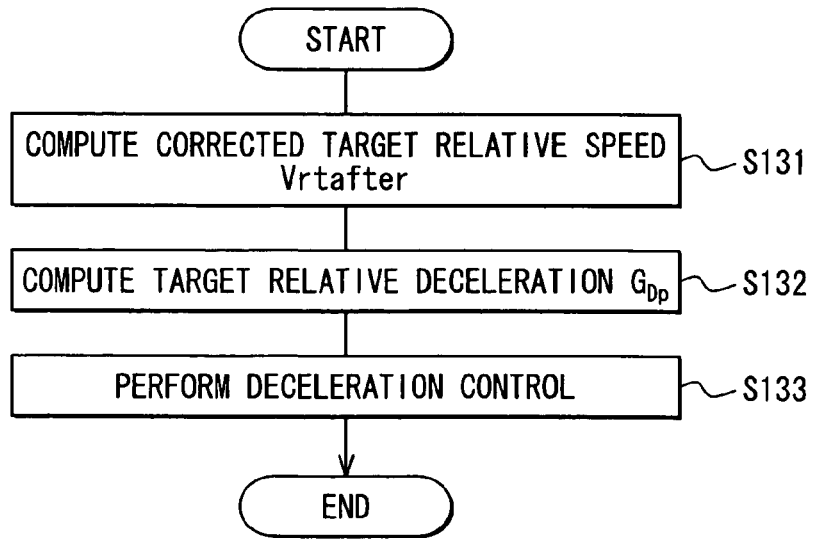
FIG. 7 is a flowchart illustrating details of processing of FIG. 6.

Details of the processing of S130 is shown in FIG. 7. At S131, the corrected target relative speed Vrtafter is computed by substituting the following into Expression 11: the current value Dp of the distance to the preceding vehicle acquired at the immediately preceding step, or S100; the initial value KdB0 of distance condition evaluation index computed at S120; and the distance D0 at the start of control and the relative speed Vr0 used to compute this initial value KdB0.

At S132, subsequently, the current value Dp of the distance to the preceding vehicle is differentiated to determine the present relative speed Vrp between the subject vehicle and the preceding vehicle. This present relative speed Vrp and the corrected target relative speed Vrtafter computed at S131 are substituted into Expression 15. A target relative deceleration $G_{Dp}$ to be produced in the subject vehicle is thereby computed. In Expression 15, T is a divisor for transforming the difference between the present relative speed Vrp of the subject vehicle and the corrected target relative speed Vrtafter into the target relative deceleration $G_{Dp}$ and is appropriately set.

$$G_{Dp} = (Vrp - Vrtafter)/T \qquad \text{(Expression 15)}$$

At S133, the target relative deceleration $G_{Dp}$ computed at S132 is outputted to the VSC ECU 10. The VSC ECU 10 carries out deceleration control using a brake actuator, not shown, so that the target relative deceleration $G_{Dp}$ inputted from the vehicle control ECU 100 is produced in the subject vehicle.

In the second embodiment, as described above, deceleration control is performed using a formula for computation of corrected target relative speed (Expression 11) obtained by offsetting the target relative speed at distance D=0 to the positive side by the relative speed Vroffset. The corrected target relative speed Vrtafter obtained by Expression 11 becomes zero before the distance D to the preceding vehicle becomes zero. For this reason, it is possible to match deceleration control with the feeling of the driver more and achieve smooth deceleration control.

Modification to Second Embodiment

The formula for computation of corrected target relative speed (Expression 11) used in the second embodiment is an expression obtained by multiplying the target relative speed Vrt that can be computed by Expression 6 by the ratio "a". Instead, Expression 16, obtained by adding the following term to the target relative speed Vrt that can be computed by Expression 6, may be used in place of Expression 11: a term obtained by multiplying the ratio of the travel distance (D0−D) since the start of control to the distance D0 at the start of control by the offset relative speed Vroffset:

$$Vrtafter = -2.5 \times D^3 \times 10^{(\frac{-1.303}{D0} \times D + 0.1 \times KdB0 - 6.697)} + \left(\frac{Vroffset}{Do}\right) \times (D0 - D) \qquad \text{(Expression 17)}$$

Figure 8:
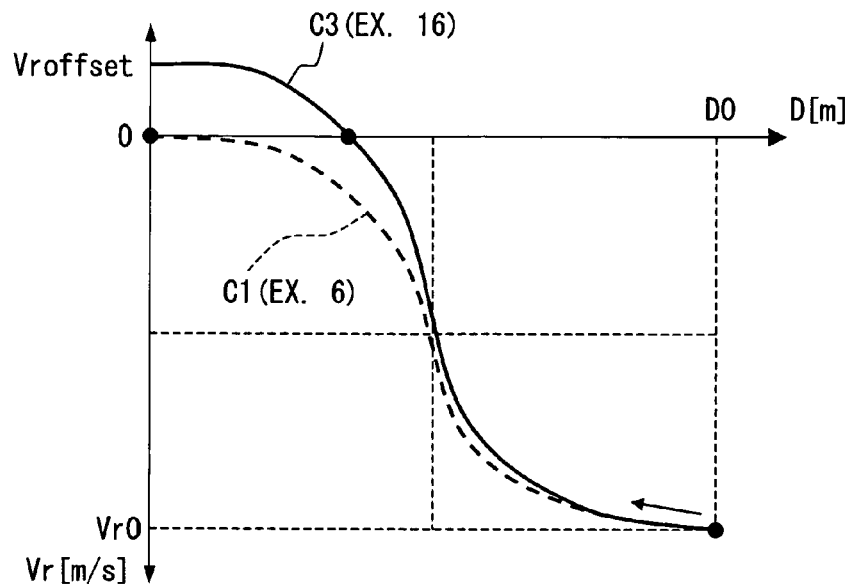
FIG. 8 is an explanatory diagram illustrating comparison between curve C3 represented by a formula for computation of corrected target relative speed and curve C1 for computation of target relative speed.

FIG. 8 illustrates comparison between a curve C3 represented by the formula for computation of corrected target relative speed of Expression 16 and the curve C1 represented by Expression 6 (formula for computation of target relative speed).

Third Embodiment

Figure 9:
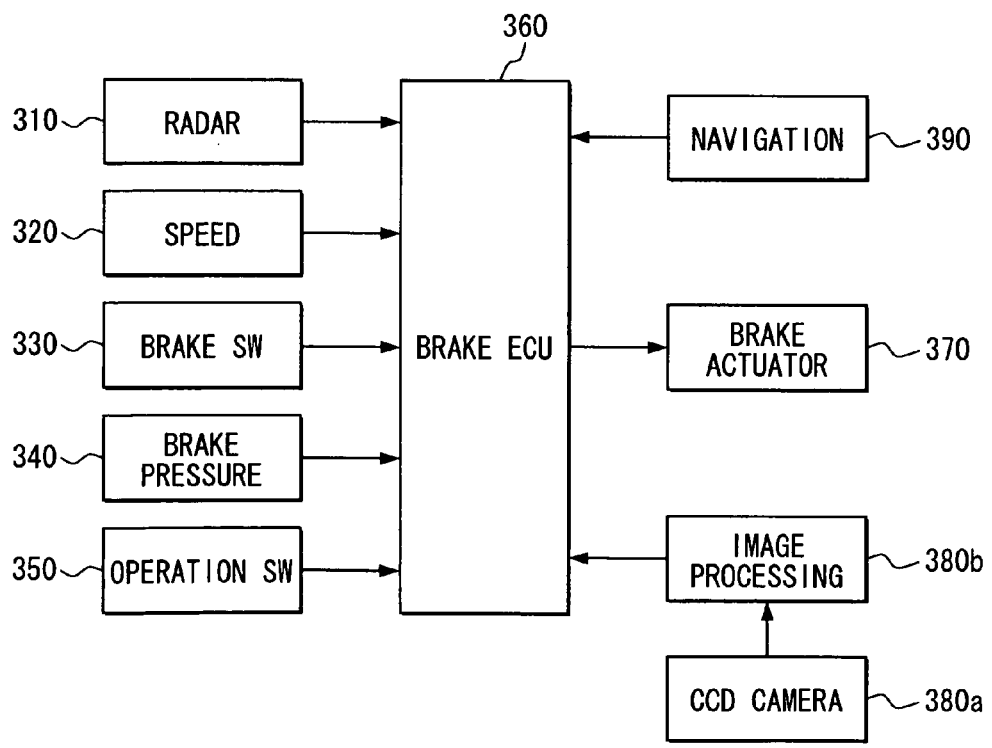
FIG. 9 is a block diagram illustrating a drive assistance system in a third embodiment.

In the third embodiment, a drive assistance system is constructed of, as shown in FIG. 9, a radar 310, a vehicle speed sensor 320, a brake switch (SW) 330, a braking pressure sensor 340, an operation switch (SW) 350, a brake ECU 360, a brake actuator 370, a CCD camera 380a, an image recognition processor 380b, and an automobile navigation system 390.

Figure 10A:
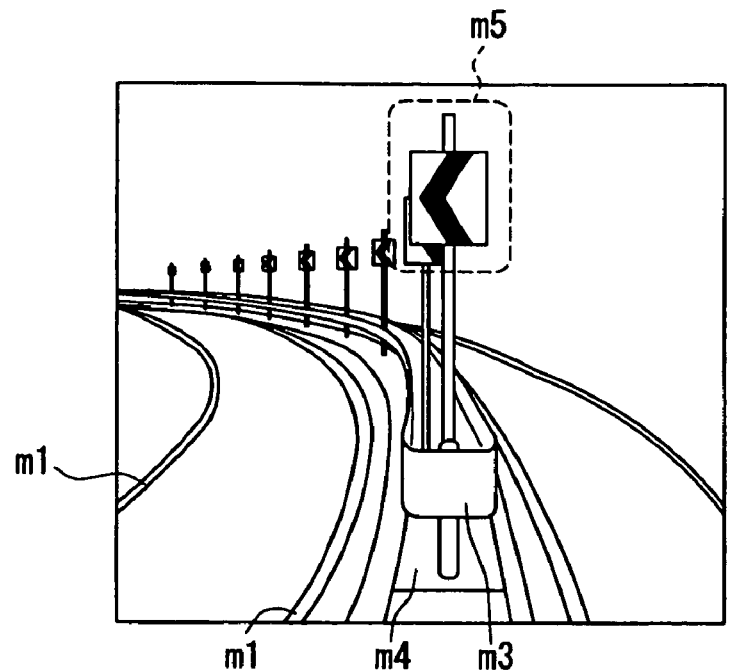
FIG. 10A is a view illustrating examples of a traffic separation line m1, a reflector plate m5, a guard rail m3, and a curb m4.
Figure 10B:
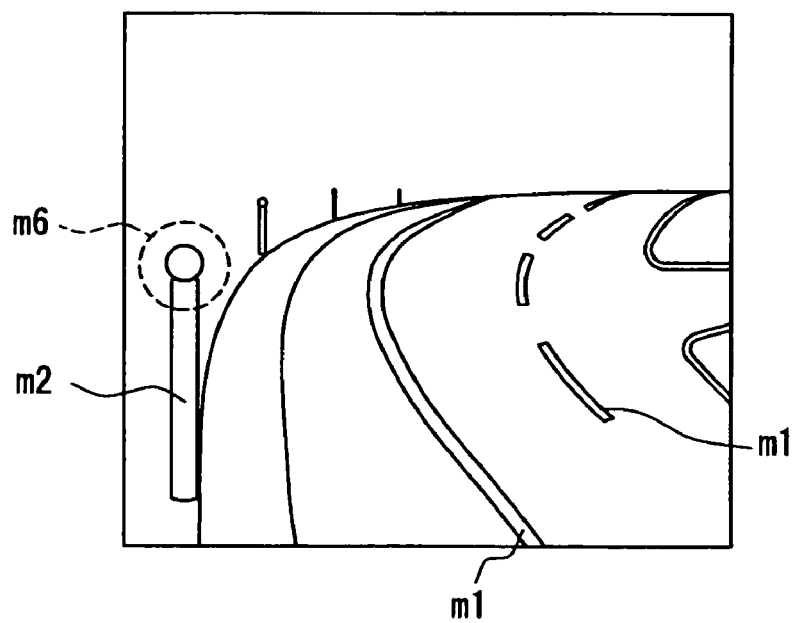
FIG. 10B is a view illustrating examples of a pole m2 and a delineator m6.

The radar 310 irradiates a predetermined range in front of the subject vehicle with, for example, laser light and receives the resulting reflected light. The radar thereby detects, for example, the following items illustrated in FIGS. 10A and 10B: distance to a forward object, such as a reflector plate m5 that is installed at a boundary of a curved road or in proximity thereto and delivers a reflected light intensity equal to or higher than a predetermined intensity or a road-affixed object such as a delineator m6 belonging to a road; lateral displacement between the central axis of the subject vehicle in the direction of width and the central axis of the road-affixed object; and the like. The radar 310 outputs the detected information to the brake ECU 360.

The vehicle speed sensor 320 detects travel speed of the subject vehicle. A road-affixed object detected by the above radar 310 is installed and fixed on the road. Therefore, the relative speed Vr between a road-affixed object and the subject vehicle is equal to the speed of the subject vehicle. The sign of the relative speed Vr is defined as follows: when the subject vehicle approaches a road-affixed object, the sign is negative (−); and when the subject vehicle separates (moves away) from a road-affixed object, the sign is positive (+).

The brake SW 330 detects brake operation performed by the driver of the subject vehicle. When the brake pedal is pressed down or operated, the brake SW outputs an ON signal. When the pedal is not operated, the brake SW outputs an OFF signal.

The braking pressure sensor 340 detects brake fluid pressure produced in a brake device (not shown), when the brake pedal is operated by the driver of the subject vehicle. The brake device presses, for example, a disc pad against a disc rotor fixed on a wheel with a strength corresponding to this brake fluid pressure to produce braking force and thereby decelerates the subject vehicle. Therefore, the deceleration produced in the subject vehicle by the driver of the subject vehicle operating the brake pedal can be estimated from the brake fluid pressure as the result of this brake operation.

The operation SW 350 is operated by the driver of the subject vehicle and a resulting operation signal is inputted to the brake ECU 360. When the brake ECU 360 assists and controls brake operation by the driver of the subject vehicle, the operation SW 350 supplies an instruction to adjust the degree of deceleration to the brake ECU 360 to gently or strongly decelerate the subject vehicle.

The brake actuator 370 adjusts the brake fluid pressure of the brake device to an arbitrary pressure according to an instruction signal from the brake ECU 360 described later.

The CCD camera 380a is an imaging means for picking up an image of an area within a predetermined range in front of the subject vehicle, and outputs a picked-up image to the image recognition processor 380b. The image recognition processor 380b carries out predetermined image recognition processing on a picked-up image outputted from the CCD camera 380a. The image recognition processor thereby recognizes a road-affixed object. Example of such objects include: traffic (travel lane) separation line m1, pole m2, guardrail m3, curbstone m4, and the like provided at a boundary of a curved road in front of the subject vehicle or in proximity thereto illustrated in FIGS. 10A and 10B.

The image recognition processor 380b determines the relative position between the road-affixed object and the subject vehicle. The processor 380b outputs information on the type of the road-affixed object and the relative position thereof to the brake ECU 360.

The automobile navigation system 390 is constructed of: a position detection unit including a geomagnetic sensor, a gyroscope, a distance sensor, a GPS receiver for global positioning system (GPS) for detecting the position of the subject vehicle based on radio waves from satellites in the known manner; a road map data storage unit for storing road map data; a color display using liquid crystal, CRT, or the like; and a control circuit.

The road map data includes link data and node data for representing a road in a map by a link and nodes. The link data and node data includes information on the coordinates of the start point, end point, and link length of each link, a width between traffic separation lines, and the curvature radius of a road. When the automobile navigation system 390 receives an instruction from the brake ECU 360, the navigation system 390 identifies the present position of the subject vehicle and outputs the following data: link data and node data related to any curved road present within a predetermined distance in front of the subject vehicle.

The brake ECU 360 assists and controls the braking force of the brake device according to input signals from the above various sensors and switches. The brake ECU 360 carries out the assist and control so that the following is implemented when the subject vehicle enters a curved road ahead in the traveling direction of the subject vehicle or is traveling along a curved road. When the subject vehicle approaches a road-affixed object and the driver performs braking operation, collision with the road-affixed object is avoided and the favorable feeling of deceleration is obtained.

In the third embodiment as well, the formula for computation of corrected target relative speed, expressed by Expression 11, is stored in a predetermined storage device, such as ROM, internal to the brake ECU 360 or a storage device provided separately from the brake ECU 360. The brake ECU 360 carries out assist and control using this formula for computation of corrected target relative speed. However, while the offset relative speed Vroffset takes a positive value in the second embodiment, the offset relative speed Vroffset is set to a negative value in the third embodiment.

Figure 11:
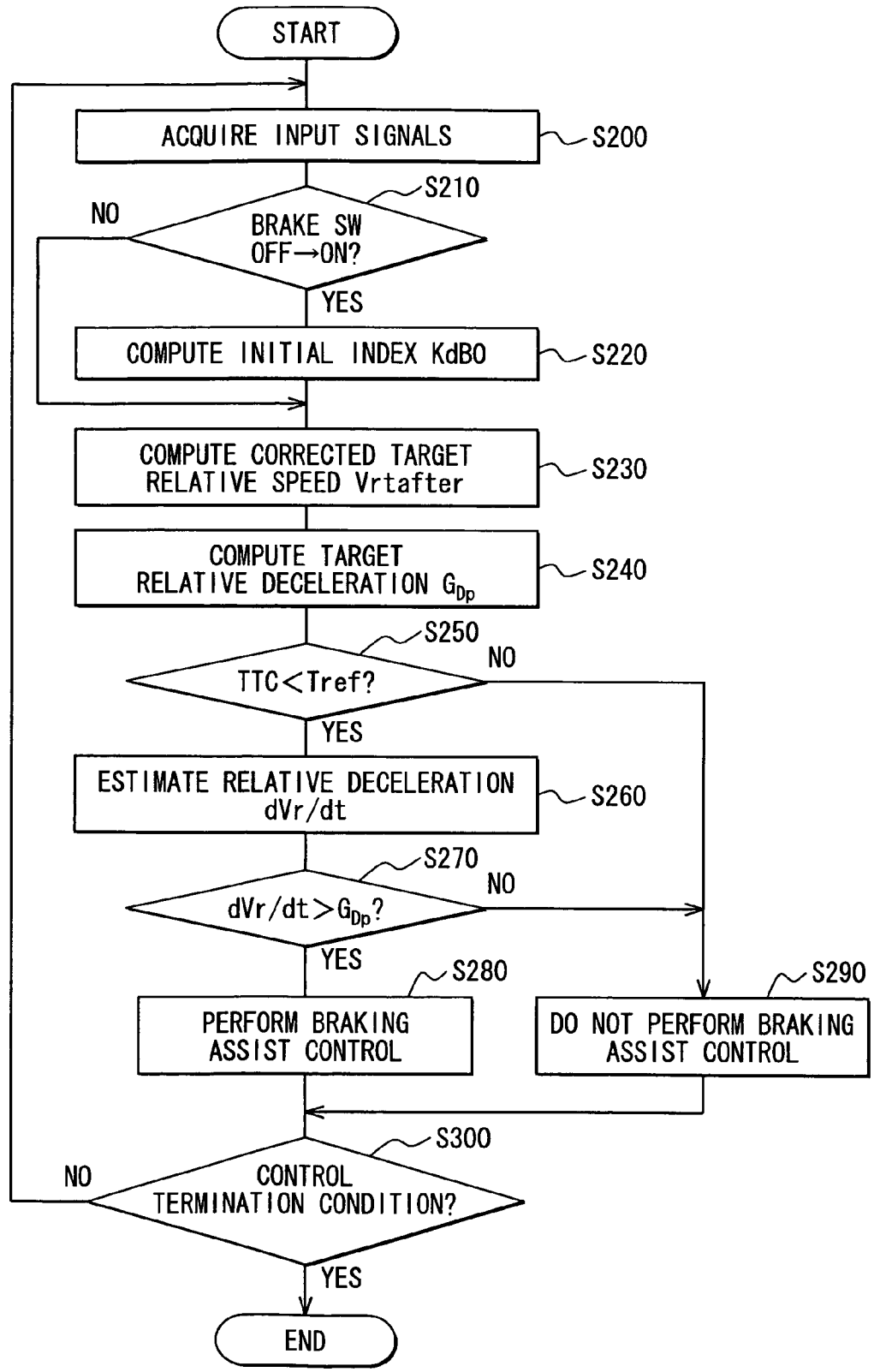
FIG. 11 is a flowchart illustrating assist control for braking force performed in the third embodiment.

Assist control for braking force (braking assist control) performed by the brake ECU 360 is executed as shown in FIG. 11. This assist control is performed when the subject vehicle enters a curved road ahead in the traveling direction of the subject vehicle or is traveling along a curved road. It is checked based on an output signal from the image recognition processor 380b or the automobile navigation system 390 whether the subject vehicle enters a curved road or is traveling along a curved road.

At S200, first, the brake ECU 360 acquires input signals from various sensors and switches 310 to 350. At S210, it is checked whether a detection signal from the brake SW 30 has changed from OFF to ON. That is, at S210, it is checked whether the driver of the subject vehicle has started brake operation.

When it is determined at S210 that the detection signal from the brake SW 330 has changed to ON, the processing proceeds to S220, and the initial evaluation index (initial value of distance condition evaluation index) KdB0 is computed. Specifically, the initial index KdB0 is computed as follows. Using the input signals acquired at the immediately preceding step, or S200, the distance D0 to a road-affixed object detected by the radar 310 is determined. Further, the vehicle speed Vs0 of the subject vehicle detected by the vehicle speed sensor 320 is determined as the relative speed Vr0. D0 and Vr0 are substituted into Expression 14 described in relation to the second embodiment.

At S230, subsequently, a corrected target relative speed Vrtafter is computed by substituting the following into Expression 11: the initial value KdB0 of distance condition evaluation index computed at S220; and the distance D to the road-affixed object acquired at the immediately preceding step, or S200.

Figure 12:
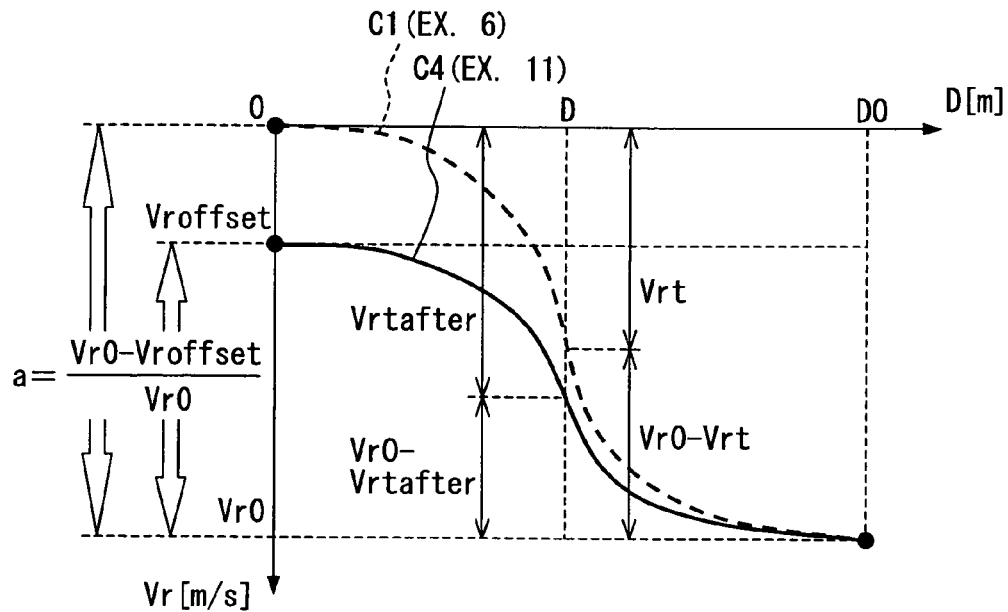
FIG. 12 is an explanatory diagram illustrating comparison between curve C4 represented by a formula for computation of corrected target relative speed in the third embodiment and curve C1 represented by a formula for computation of target relative speed.

FIG. 12 illustrates comparison between a curve C4 represented by the formula for computation of corrected target relative speed (Expression 11) in the third embodiment and a curve C1 illustrated also in FIG. 5. This curve C1 is a curve represented by a formula for computation of target relative speed (Expression 6) without the offset relative speed Vroffset provided.

In the curve C1, as illustrated in FIG. 12, the relative speed Vr becomes zero when distance D=0. Therefore, the following takes place when a road-affixed object is taken as the object of relative speed Vr and the curve C1 is used for deceleration control in curve traveling. When the distance D to the road-affixed object becomes zero, the relative speed Vr of the subject vehicle relative to the road-affixed object becomes zero, that is, the subject vehicle speed Vs0 becomes zero. In the curve C4, meanwhile, the relative speed when the distance becomes zero is equal to the offset relative speed Vroffset (<0). In the third embodiment, therefore, deceleration control is performed so that the following is implemented: the relative speed Vr when the distance D becomes zero (that is, the subject vehicle speed Vs0 in the third embodiment) becomes equal to the offset relative speed Vroffset (<0).

The value of the above offset relative speed Vroffset may be a preset constant value or a value determined based on a curvature acquired on each curved road. Further, the offset relative speed Vroffset may be determined by taking the coefficient μ of friction on a road into account in addition to the curvature. The curvature of a curved road can be determined based on an output signal from the image recognition processor 380b or the automobile navigation system 390. The coefficient μ of friction on a road can be determined by providing a road condition detector and acquiring an output signal from the road condition detector. Alternatively, the following measure may be taken: road conditions, such as dry, wet, snow covering, icy, and the like are brought beforehand into correlation with coefficients μ of friction on a road; the driver is made to select dry, wet, snow covering, icy, or the like; and the coefficient μ of friction on the road is determined from the selected road condition. The curvature of a curved road or a coefficient μ of friction on a road may be acquired by wireless communication with a source external to the subject vehicle, such as inter-vehicle communication and vehicle roadside communication.

At S240, the present relative speed Vrp (that is, subject vehicle speed Vs0) between the subject vehicle and the road-affixed object based on a signal from the vehicle speed sensor 320. This present relative speed Vrp and the corrected target relative speed Vrtafter computed at S230 are substituted into Expression 15 as in the second embodiment. A target relative deceleration $G_{Dp}$ to be produced in the subject vehicle is thereby computed.

At S250, it is checked whether a time to collision TTC, which indicates a time it takes for the subject vehicle to collide with a road-affixed object, is shorter than a predetermined time Tref. When it is determined as the result of the determination processing of S260 that TTC<Tref, the processing proceeds to S260. When it is determined that TTC≧Tref, the processing proceeds to S290.

When it is determined that TTC≧Tref, there is a sufficient time to collision TTC when brake operation is started by the driver. It is expected that collision with a road-affixed object can be sufficiently avoided by brake operation or the like by the driver him/herself. At S290, therefore, assist control for braking force by this brake control unit is not performed.

At S260, the deceleration dVr/dt produced in the subject vehicle is estimated based on the breaking pressure produced as the result of brake operation by the driver. At S270, it is checked whether the estimated deceleration dVr/dt corresponding to the brake operation by the driver is greater than the target relative deceleration $G_{Dp}$ computed at S240. A deceleration is represented as a negative (−) value. Therefore, that "the estimated deceleration dVr/dt corresponding to the brake operation by the driver is greater than the target relative deceleration $G_{Dp}$" means the following: the brake operation by the driver produces too low degree of deceleration to decelerate the subject vehicle with the target relative deceleration $G_{Dp}$.

When an affirmative determination is made at S270, therefore, the processing proceeds to S280 and braking force assist control is performed at S280. That is, this braking force assist control is performed in cases where: the time to collision TTC it takes for the subject vehicle to collide with a road-affixed object is shorter than a predetermined time Tref; and the subject vehicle cannot be decelerated with the target relative deceleration $G_{Dp}$ by brake operation by the driver of the subject vehicle.

In the braking force assist control performed at S280, the following processing is performed: a braking pressure for producing the target relative deceleration $G_{Dp}$ computed at S240 is determined from a prepared map and the brake actuator 370 is controlled so as to produce this braking pressure; or the actual deceleration of the subject vehicle is detected and the braking pressure is adjusted by the brake actuator 370 so that this actual deceleration becomes equal to the target relative deceleration $G_{Dp}$.

When it is conversely determined at S270 that the estimated deceleration dVr/dt corresponding to brake operation by the driver is lower than the target relative deceleration $G_{Dp}$, the subject vehicle can be decelerated with a deceleration higher than the target relative deceleration $G_{Dp}$ by brake operation by the driver. Since it is expected that sufficient deceleration is produced by brake operation by the driver, it is unnecessary to carry out assist control by the brake control unit. Therefore, the processing proceeds to S290 and braking force assist control is not performed.

At S300, it is checked whether a termination condition for the assist control has been met. For example, the following events can be used for this control termination condition: the subject vehicle is stopped; and the time to collision TTC exceeds the predetermined time Tref. When the control termination condition has not been met, the processing of S200 and the following steps is repeated.

In the third embodiment, as described above, deceleration control is performed using the formula for computation of corrected target relative speed (Expression 11). This formula is obtained by offsetting the target relative speed Vr (equal to the subject vehicle speed Vs0 in the third embodiment) at the distance D to a road-affixed object=0 to the negative side by the relative speed Vroffset. Therefore, it is possible to bring the relative speed Vr (that is, the subject vehicle speed Vs0) when the distance D to the road-affixed object becomes zero to the negative side and achieve smooth deceleration control during curve traveling. The above negative side is the side on which the vehicle does not approach the road-affixed object.

Modification to Third Embodiment

In the third embodiment, the brake ECU 360 carries out assist control. Because of assist control, that brake operation is started by the driver of the subject vehicle is taken as a criterion for starting assist control. Instead, deceleration control may be performed regardless of brake operation by the driver.

In this case, the following measure is taken: a deceleration target KdBssdc representing an index of the timing with which the braking force of the brake device is controlled is computed from the normal deceleration of the subject vehicle, the distance to a road-affixed object, and the actual relative speed; and the time when it is determined that the current value KdBp of distance condition evaluation index exceeds the deceleration target KdBssdc is taken as the time to start deceleration control.

The above deceleration target KdBssdc is computed by Expression 17, and the current value KdBp of distance condition evaluation index is computed by Expression 14:

$$KdBssdc = 10 \times \left(8 + \log\left|\frac{nd}{7.5 \times D^2 \times Vr}\right|\right) \quad \text{(Expression 17)}$$

Expression 17 is derived in the following manner. First, Expression 1 is differentiated to obtain Expression 18 below:

$$\frac{dVr}{dD} \times \frac{dD}{dt} = 7.5 \times D^2 \times 10^{\{(|KdB|/10)-8\}} \times Vr \quad \text{(Expression 18)}$$

Since Expression 18 represents deceleration, the normal deceleration nd of the subject vehicle and the deceleration target KdBssdc at that time can be expressed as in Expression 19. The normal deceleration of the subject vehicle is, for example, normal deceleration produced in the subject vehicle by the driver performing driving operation to decelerate the subject vehicle.

$$nd = 7.5 \times D^2 \times 10^{\{(|KdB\,ssdc|/10)-8\}} \times Vr \quad \text{(Expression 19)}$$

Expression 20 is obtained by modifying Expression 19.

$$10^{[(|KdB\ ssdc|/10)-8]} = \frac{nd}{7.5 \times D^2 \times Vr} \quad \text{(Expression 20)}$$

Expression 17 represents Expression 20 by logarithm. As described above, the normal deceleration nd in Expression 17 is normal deceleration produced in the subject vehicle by the driver performing driving operation to decelerate the subject vehicle. Instead, the normal deceleration may be deceleration produced in the subject vehicle by engine brake.

When Vroffset in Expression 16 is set to a negative value, Expression 16 can be used also in the third embodiment.

Fourth Embodiment

In the fourth embodiment as well, a drive assistance system is the same as that of the second embodiment. In the second embodiment, deceleration control is performed using a formula for computation of corrected target relative speed (Expression 11) having an offset relative speed Vroffset (>0). In the fourth embodiment, however, the offset relative speed Vroffset is not provided, and instead, an offset distance Doffset having a positive value is provided and deceleration control is performed using Expression 21 below. For this reason, the formula for computation of corrected target relative speed of Expression 21 is stored in a predetermined storage device:

$$Vrtafter = -2.5 \times Dafter^3 \times 10^{(\frac{-1.303}{D0} \times Dafter + 0.1 \times KdB0 - 6.697)} \quad \text{(Expression 21)}$$

In Expression 21, Dafter is a corrected target minimum inter-vehicle distance, which is expressed by Expression 22.

$$Dafter = D0 - \frac{D0 \times (D0 - D)}{D0 - Doffset} \quad \text{(Expression 22)}$$

Expression 21 is obtained by substituting a corrected target minimum inter-vehicle distance Dafter for D in Expression 6. Expression 22 can be computed from a ratio "b" indicated in FIG. 13. This ratio "b" is a ratio of a distance determined by the formula for computation of target relative speed of Expression 6 at a given relative speed Vr to a distance determined by the formula for computation of corrected target relative speed of Expression 21. This ratio "b" can be expressed as in the right-hand side of Expression 23 as a general formula. When the relative speed Vr is zero, the ratio "b" can be expressed as in the middle part of Expression 23. Expression 22 can be obtained by modifying Expression 23:

$$b = \frac{D0 - Doffset}{D0} = \frac{D0 - D}{D0 - Dafter} \quad \text{(Expression 23)}$$

The control performed by the vehicle control ECU 100 in the fourth embodiment is the same as in the second embodiment except that an expression used in deceleration control is different. The following event may be used for the deceleration control start condition in addition to the condition in the second embodiment or in place of the condition in the second embodiment: an instruction to carry out control for following the preceding vehicle is given by the driver. This control is speed control to vary the speed of the subject vehicle according to the speed of the preceding vehicle.

Figure 13:
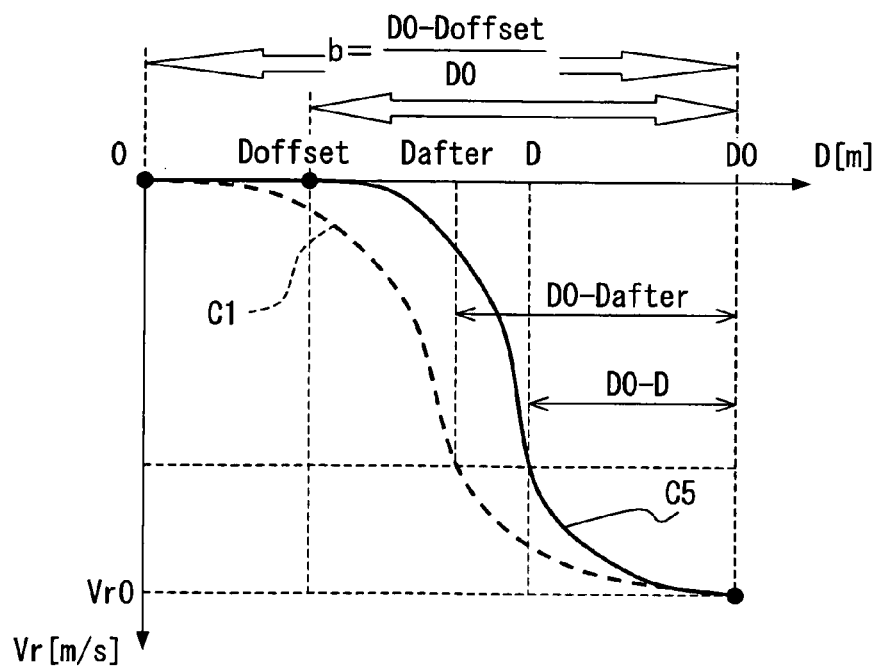
FIG. 13 is an explanatory diagram illustrating comparison between curve C5 represented by a formula for computation of corrected target relative speed in a fourth embodiment and curve C1 represented by a formula for computation of target relative speed.

In deceleration control using Expression 21 (curve C5), as seen from FIG. 13 as well, deceleration control is performed so that with the offset distance Doffset, the distance when the relative speed Vr becomes zero has a positive value. That is, deceleration control is performed with the closest inter-vehicle distance ensured. Therefore, the fourth embodiment is suitable for control for following the preceding vehicle, such as adaptive cruise control.

A favorable value of the above offset distance Doffset may be determined as follows. First, Expression 24 can be obtained by modifying Expression 10:

$$Vr = -2.5 \times D^3 \times 10^{(\frac{KdB\ c}{10} - 8)} + \alpha \times Vb \quad \text{(Expression 24)}$$

As described in U.S. patent application Ser. No. 12/151, 998, the point at which the driver starts brake operation is distributed on one curve in a graph. In this graph, the distance D is taken as horizontal axis and the corrected distance condition evaluation index KdBc is taken as vertical axis. This curve can be represented by Expression 25 below. Expression 25 indicates the relation between the corrected distance condition evaluation index KdBc and the distance D when the driver starts brake operation. Therefore, Expression 25 can be used to discriminate a point at which brake operation is started. For this reason, this expression may also be designated as brake discriminant.

$$KdBc - \beta \log_{10} D - \gamma = 0 \quad \text{(Expression 25)}$$

where, $\beta$ and $\gamma$ are constants determined based on experiment.

When Expression 25 is substituted into Expression 24, Expression 26 below can be obtained:

$$Vr = -2.5 \times D^3 \times 10^{(\frac{\beta \times \log_{10} D + \gamma}{10} - 8)} + \alpha \times Vb \quad \text{(Expression 26)}$$

When Vr=0 in Expression 26, Expression 27 is obtained. Expression 28 is obtained by modifying Expression 27:

$$2.5 \times D^3 \times 10^{(\frac{\beta \times \log_{10} D + \gamma}{10} - 8)} - \alpha \times Vb = 0 \quad \text{(Expression 27)}$$

$$10^{(\frac{\beta \times \log_{10} D + \gamma}{10} - 8)} = \frac{\alpha \times Vb}{2.5 \times D^3} = \frac{\alpha/2.5 \times Vb}{D^3} \quad \text{(Expression 28)}$$

When the logarithms of both sides of Expression 28 are taken, Expression 29 is obtained. When Expression 30 is sequentially modified, Expressions 30, 31, and 32 are obtained:

$$\frac{\beta \times \log_{10} D + \gamma}{10} - 8 = \log_{10} \frac{\alpha}{2.5} + \log_{10} Vb - 3\log_{10} D \quad \text{(Expression 29)}$$

$$(\beta + 30)\log_{10} D = 80 + 10\log_{10} \frac{\alpha}{2.5} + \log_{10} Vb - \gamma \quad \text{(Expression 30)}$$

$$\log_{10} D = \frac{80 + 10\log_{10} \frac{\alpha}{2.5} + 10\log_{10} Vb - \gamma}{\beta + 30} \quad \text{(Expression 31)}$$

$$D = 10^{\frac{80 + 10\log_{10} \frac{\alpha}{2.5} + 10\log_{10} Vb - \gamma}{\beta + 30}} = Doffset \quad \text{(Expression 32)}$$

Expression 32 is equivalent to the formula for computation of offset distance. A value obtained by substituting the actually detected speed Vb of the preceding vehicle into Expression 32 is used as the offset distance Doffset.

Expression 32 is computed from the brake discriminant indicated by Expression 25. The brake discriminant indicated by Expression 25 indicates a distance at which the driver starts brake operation. Therefore, it can be said that Expression 32 (formula for computation of offset distance), which can be computed from the brake discriminant of Expression 24, indicates the distance D to the preceding vehicle at which the driver starts brake operation. For this reason, the driver can get the feeling of safety from deceleration control when the distance D to the preceding vehicle, computed using Expression 32 (formula for computation of offset distance) is taken as the offset distance Doffset.

Especially, adaptive cruise control is performed so that the relative speed Vr becomes zero. The formula for computation of offset distance of Expression 32 is obtained by zeroing the relative speed Vr. When adaptive cruise control is active, for this reason, it is especially favorable to use the offset distance Doffset computed using the formula for computation of offset distance of Expression 32.

The present invention is not limited to the above embodiments at all and can be implemented in many modified ways.

For example, when the preceding vehicle rapidly decelerates or the road condition is bad and the subject vehicle cannot decelerate with a target deceleration, the subject vehicle cannot complete deceleration control at the offset distance Doffset and further approaches the preceding vehicle.

To cope with this, for example, the following measure may be taken when the actual inter-vehicle distance D to the preceding vehicle becomes shorter than the offset distance Doffset: the target deceleration of the subject vehicle when the actual inter-vehicle distance D to the preceding vehicle is equal to the offset distance Doffset is maintained and the execution of deceleration control is continued; or the deceleration (Vr/t0) obtained by dividing the relative speed Vr between the subject vehicle and the preceding vehicle by a predetermined time t0 is taken as the acceleration/deceleration $G_{Dp}$ of the subject vehicle to be taken as a target and the execution of deceleration control is continued.

Figure 4:
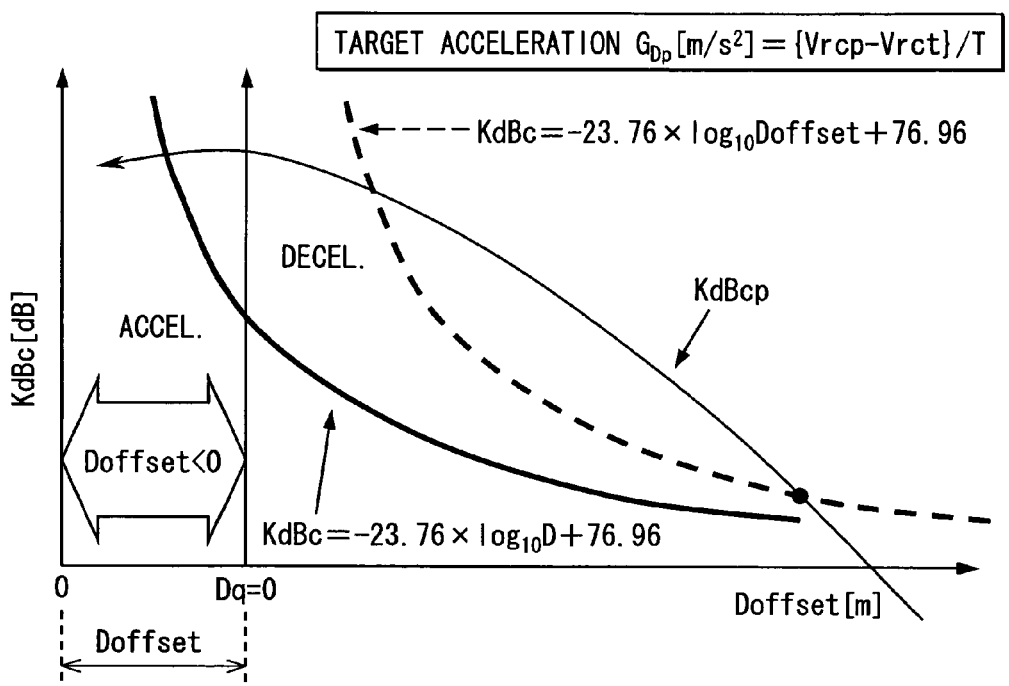
FIG. 4 is an explanatory diagram illustrating a threshold value of corrected distance condition evaluation index KdBc used when the actual inter-vehicle distance D to the preceding vehicle becomes shorter than offset distance Doffset, in a modification.

When the actual inter-vehicle distance D becomes shorter than the offset distance Doffset, determination is performed using the following brake discriminant: the brake discriminant KdBc (Expression 33, solid line in FIG. 4) in which the zero value of the actual inter-vehicle distance D to the preceding vehicle is taken as the zero value of inter-vehicle distance in the brake discriminant KdBc, as illustrated in FIG. 14:

$$KdBc = -23.76 \times \log_{10} D + 76.96 \quad \text{(Expression 33)}$$

Thus, even when the actual inter-vehicle distance D to the preceding vehicle becomes shorter than the offset distance Doffset, further approach to the preceding vehicle can be suppressed.

What is claimed is:

1. A speed control system for vehicles comprising:
means for detecting a distance to a preceding vehicle;
means for detecting a relative speed between a subject vehicle and the preceding vehicle;
means for computing a corrected distance condition evaluation index which is increased with increase in the relative speed when approaching the preceding vehicle and whose increase gradient becomes greater as the distance to the preceding vehicle becomes shorter at each relative speed as an index indicating the condition of approaching or separating from the preceding vehicle by taking into consideration of a speed of the preceding vehicle;
first means for setting a threshold value of the corrected distance condition evaluation index and taking an offset amount preset with respect to distance as zero value of distance at the threshold value of the corrected distance condition evaluation index;
means for checking whether the corrected distance condition evaluation index is higher than the threshold value of the corrected distance condition evaluation index;
second means for setting the threshold value of the corrected distance condition evaluation index as a target value of the corrected distance condition evaluation index when the corrected distance condition evaluation index is higher than the threshold value of the corrected distance;
means for computing the target deceleration of the subject vehicle based on a target relative speed corresponding to the target value set by the means for setting the threshold value as the target value and an actual relative speed; and
means for starting deceleration control to decelerate the subject vehicle so that deceleration of the subject vehicle becomes equal to the target deceleration.

2. The speed control system for vehicles of claim 1, wherein the starting means maintains the target deceleration of the subject vehicle when the actual distance is equal to the offset amount and continues the execution of deceleration control, when the actual distance is shorter than the offset amount.

3. The speed control system for vehicles of claim 1, wherein the starting means takes a deceleration obtained by dividing the relative speed by a predetermined time as the target deceleration of the subject vehicle and continues execution of deceleration control, when the actual distance is shorter than the offset amount.

4. The speed control system for vehicles of claim 1, wherein:
the first setting means also computes the threshold value of a corrected distance condition evaluation index in which the zero value of the actual distance is taken as the zero value of distance at the threshold value of the corrected distance condition evaluation index; and
the checking means carries out determination using the threshold value of the corrected distance condition evaluation index in which the zero value of the actual distance to the preceding vehicle is taken as the zero value of distance at the threshold value of the corrected distance condition evaluation index, when the actual distance is shorter than the offset amount.

5. The speed control system for vehicles of claim 1, wherein the offset amount is set based on speed control setting information of the subject vehicle.

6. The speed control system for vehicles of claim 5, wherein, when the speed control setting information indicates that control to carry out speed control so that the relative speed between the subject vehicle and the preceding vehicle becomes zero at a constant distance to the preceding vehicle is active, the offset amount is set using the following formula for computation of offset distance $$Doffset = 10^{\frac{80 + 10\log_{10}\frac{\alpha}{2.5} + 10\log_{10} Vb - \gamma}{\beta + 30}}$$

where, $\alpha$, $\beta$ and $\gamma$ are constants determined based on experiment and Vb is the speed of the preceding vehicle.

7. The speed control system for vehicles of claim 1,
wherein the offset amount is set based on information acquired by wireless communication with an external source, the information being on external environment having influence on traveling speed of the subject vehicle.

8. A speed control system for vehicles comprising:
means for detecting a distance to an object ahead;
means for detecting a relative speed between a subject vehicle and the object ahead;
means for storing a correction formula for computation of a corrected target relative speed obtained by correcting a formula for computation of a target relative speed with an offset amount indicating the target relative speed when the distance is zero,
wherein the formula for computation of target relative speed is determined from a distance condition evaluation index relational expression and a tangential expression so that a target relative speed is determined based on the distance,
wherein, the distance condition evaluation index relational expression indicates a relation among the distance condition evaluation index indicating condition of distance to the object ahead, a distance to the object ahead and the relative speed, so that the distance condition evaluation index is increased with increase in the relative speed when approaching the object ahead and an increase gradient of the distance condition evaluation index becomes greater as the distance to the object ahead becomes shorter at identical relative speed, and
wherein the tangential expression indicates a tangent of a curve represented by the distance condition evaluation index relational expression, and is determined by differentiating the distance condition evaluation index relational expression by the distance, thereby indicating a relation between the distance condition evaluation index and the distance;
means for computing a target relative speed from the correction formula for computation of target relative speed and a distance actually detected by the means for detecting the distance;
means for computing a target deceleration from a target relative speed computed by the means for computing a target relative speed and a relative speed actually detected by the means for detecting the relative speed; and
means for performing deceleration control on the subject vehicle based on the target deceleration.

9. The speed control system for vehicles of claim 8,
wherein the offset amount is set based on speed control setting information of the subject vehicle.

10. The speed control system for vehicles of claim 9,
wherein, when the speed control setting information indicates that control to carry out speed control so that the relative speed between the subject vehicle and the preceding vehicle becomes zero at a constant distance to the preceding vehicle is active, the offset amount is set using the following formula for computation of offset distance $$Doffset = 10^{\frac{80+10\log_{10}\frac{\alpha}{2.5}+10\log_{10}Vb-\gamma}{\beta+30}}$$

where, $\alpha$, $\beta$ and $\gamma$ are constants determined based on experiment and $Vb$ is the speed of the preceding vehicle.

11. The speed control system for vehicles of claim 8,
wherein the offset amount is set based on information acquired by wireless communication with an external source, the information being on external environment having influence on traveling speed of the subject vehicle.

12. A speed control system for vehicles comprising:
means for detecting a distance to an object ahead;
means for detecting a relative speed between a subject vehicle and the object ahead;
means for storing a correction formula for computation of a corrected target relative speed obtained by correcting a formula for computation of a target relative speed with an offset amount indicating the distance when the relative speed is zero,
wherein the formula for computation of target relative speed is determined from a distance condition evaluation index relational expression and a tangential expression so that a target relative speed is determined based on the distance,
wherein, the distance condition evaluation index relational expression indicates a relation among the distance condition evaluation index indicating condition of distance to the object ahead, a distance to the object ahead and the relative speed, so that the distance condition evaluation index is increased with increase in the relative speed when approaching the object ahead and an increase gradient of the distance condition evaluation index becomes greater as the distance to the object ahead becomes shorter at identical relative speed, and
wherein the tangential expression indicates a tangent of a curve represented by the distance condition evaluation index relational expression, and is determined by differentiating the distance condition evaluation index relational expression by the distance, thereby indicating a relation between the distance condition evaluation index and the distance;
means for computing a target relative speed from the correction formula for computation of target relative speed and a distance actually detected by the means for detecting the distance;
means for computing a target deceleration from a target relative speed computed by the means for computing a target relative speed and a relative speed actually detected by the means for detecting the relative speed; and
means for performing deceleration control on the subject vehicle based on the target deceleration.

13. The speed control system for vehicles of claim 12, wherein:
the distance condition evaluation index is computed as a corrected distance condition evaluation index from the relative speed between the subject vehicle and the preceding vehicle, the speed of the preceding vehicle and the distance to the preceding vehicle, so that the distance condition to the preceding vehicle in consideration of the speed of the preceding vehicle is indicated, the corrected distance condition evaluation index being increased with increase in the relative speed when approaching the preceding vehicle, and an increase gradient becoming greater as the distance to the preceding vehicle becomes shorter at each relative speed;
the offset amount in the formula for computation of corrected target relative speed uses the distance to the preceding vehicle computed by taking the speed of the preceding vehicle as actual detection value in a formula for computation of offset distance, which indicates a relation between the distance to the preceding vehicle and the speed of the preceding vehicle, and which is obtained from a formula for computing the corrected evaluation index and a deceleration start discriminant by zeroing the relative speed, the deceleration start discriminant indicating a relation between the corrected distance condition evaluation index and the distance to the preceding vehicle when deceleration of the subject vehicle is started.

14. The speed control system for vehicles of claim 12, wherein the starting means maintains the target deceleration of the subject vehicle when the actual distance is equal to the offset amount and continues the execution of deceleration control, when the actual distance is shorter than the offset amount.

15. The speed control system for vehicles of claim 12, wherein the starting means takes a deceleration obtained by dividing the relative speed by a predetermined time as the target deceleration of the subject vehicle and continues execution of deceleration control, when the actual distance is shorter than the offset amount.

16. The speed control system for vehicles of claim 12, wherein the offset amount is set based on speed control setting information of the subject vehicle.

17. The speed control system for vehicles of claim 16, wherein, when the speed control setting information indicates that control to carry out speed control so that the relative speed between the subject vehicle and the preceding vehicle becomes zero at a constant distance to the preceding vehicle is active, the offset amount is set using the following formula for computation of offset distance $$Doffset = 10^{\frac{80+10\log_{10}\frac{\alpha}{2.5}+10\log_{10}Vb-\gamma}{\beta+30}}$$

where, $\alpha$, $\beta$ and $\gamma$ are constants determined based on experiment and Vb is the speed of the preceding vehicle.

18. The speed control system for vehicles of claim 12, wherein the offset amount is set based on information acquired by wireless communication with an external source, the information being on external environment having influence on traveling speed of the subject vehicle.

* * * * *